United States Patent

[11] 3,572,760

| | | |
|---|---|---|
| [72] | Inventor | Jess Jerome Jones<br>Dixon, Calif. |
| [21] | Appl. No. | 801,642 |
| [22] | Filed | Feb. 24, 1969 |
| [45] | Patented | Mar. 30, 1971 |
| [73] | Assignee | Deere & Company<br>Moline, Ill. |

[54] QUICK-COUPLER
4 Claims, 3 Drawing Figs.

[52] U.S. Cl. .................................................. 280/461,
172/272
[51] Int. Cl. .................................................. B60d 1/04
[50] Field of Search .......................................... 280/461,
460, 479; 172/272

[56]       References Cited
UNITED STATES PATENTS
3,220,751  11/1965  Tweedale .................... 280/461(.1)
3,312,478  4/1967  Knaapi ......................... 280/405

FOREIGN PATENTS
1,036,257  7/1966  Great Britain ................ 280/479

OTHER REFERENCES
Muncke, Ludwig German printed application No. 1,277,608 172/272 Published 12 September, 1968

Primary Examiner—Leo Friaglia
Attorneys—H. Vincent Harsha, Harold M. Knoth, William A. Murray and John M. Nolan ABSTRACT: A quick-coupler having a pair of spaced upwardly open lower hooks and a centered upper hook for receiving the hitch pins of an implement. The upper hook is pivotally mounted for movement between a first position in which it is rearwardly open and a second position in which it is downwardly open. A latch lever is mounted adjacent the upper hook for movement in a path perpendicular to the path of movement of the upper hook between an open position and a locking position in which it extends across the path of movement of the upper hook to lock the upper hook in the second position.

PATENTED MAR 30 1971

3,572,760

INVENTOR.
J. J. JONES

_3,572,760_

QUICK-COUPLER

BACKGROUND OF THE INVENTION

The present invention relates generally to a quick-coupler for facilitating the attachment of integrally mounted implements to a tractor provided with a power operated three-point hitch.

The typical quick-coupler consists of a generally vertically extending frame which is mounted on the power-operated three-point hitch linkage of a tractor and is provided with rearwardly extending projections having upwardly open notches or hooks which are adapted to receive the hitch pins on the implement. The typical quick-coupler is also provided with latching mechanisms for maintaining the implement hitch pins in the hooks during operation.

The quick-couplers as described above have greatly simplified the attachment of implements to tractors, but the latching mechanisms employed to hold the implement hitch pins within the coupler hooks have been unduly complicated and were not susceptible to economical manufacture.

SUMMARY OF THE INVENTION

The primary object of the present invention is to provide a quick-coupler having simplified latching means to hold the hitch pins of an implement within the hooks of the coupler.

A more specific object of the invention is to provide a quick-coupler in which the upper hook for receiving the upper hitch pin of the implement to be attached thereto is pivotally mounted for movement between a first position in which it is rearwardly open to permit relative vertical movement between the coupler and the implement for effecting movement of the implement lower hitch pins into or out of the upwardly open lower hooks of the coupler and a second position in which it is downwardly open and prevents relative vertical movement between the coupler and implement to be attached thereto.

Yet another object of the invention is to provide a quick-coupler in which the upper hook for receiving the upper hitch pin of the implement to be attached thereto is pivotally mounted for movement between positions in which it is rearwardly open and downwardly open and includes a pivotally mounted lever movable into the path of the movement of the hook to lock the hook in the downwardly open position.

The above and additional objects and advantages of the present invention will become apparent along with the details of construction of a preferred embodiment of the invention from a reading of the following description taken in conjunction with the accompanying drawings.

DESCRIPTION OF THE PREFERRED EMBODIMENT

Figure 1:
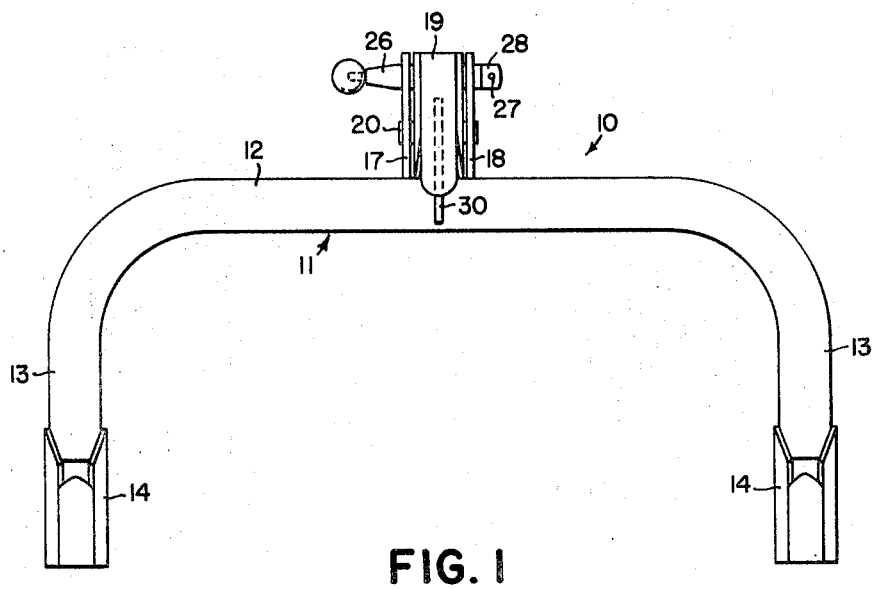
FIG. 1 is a rear elevational view of a quick-coupler constructed in accordance with the principles of the present invention.

Referring now to the drawing, a quick-coupler which is constructed in accordance with the principles of the present invention as indicated generally at 10 and comprises a frame member 11 that includes an upper transverse section 12 and a pair of depending legs 13. The frame member 11 is preferably formed as a square pipe, but may take any desired form. A mounting hook 14 is secured to the lower end of each leg 13 in any suitable manner such as welding. Each of the mounting hooks 14 is formed from a flat section of metal bent intermediate its ends to form a generally U-shaped member which has the ends of its legs fixed to one of the depending legs 13 of the frame member 11 and the bight extending rearwardly from the depending leg 13. The rearwardly projecting portion of each mounting hook 14 is notched as at 15 to provide an upwardly open hook. Each of the mounting hooks 14 is also provided with apertures 16 to receive mounting pins which will connect the coupler to the trailing ends of the draft links of a conventional three-point hitch.

An upper mounting hook 19 is pivotally mounted between a pair of upstanding ears 17, 18 by a pin 20. The ears 17 and 18 are fixedly mounted by welding or the like on the top side of the transverse section 12 in transversely spaced relationship to one another. The ears 17 and 18 are apertured intermediate their ends to receive the pin 20 which pivotally mounts the upper mounting hook 19. The upper mounting hook 19 is similar to the lower mounting hooks 14 in that it is formed from a flat section of metal and is bent through 180° intermediate its ends to form a generally U-shaped member. The legs of the upper hook member 19 are apertured to receive the pivot pin 20 and are also notched as at 21 to provide a hook which is downwardly open when the mounting hook 19 is in the closed position illustrated in the drawings. The mounting hook 19 can be rotated clockwise from the closed position illustrated in which the hook is downwardly open to an open position in which the hook is rearwardly open.

Figure 2:
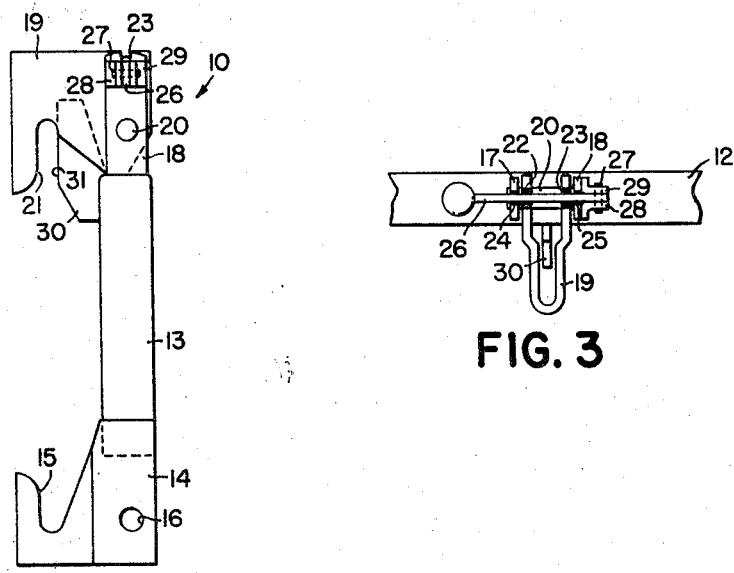
FIG. 2 is a side elevational view of the coupler illustrated in FIG. 1.
Figure 3:
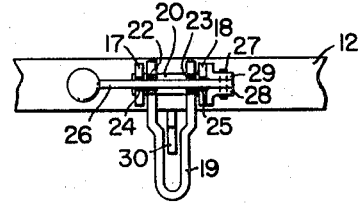
FIG. 3 is a top plan view of the center portion of the coupler illustrated in FIG. 1.

The upper mounting hook 19 can be locked in its closed position to prevent accidental movement thereof, and to this end its legs are provided with upwardly open slots 22 and 23 which correspond with similar upwardly open slots 24 and 25 provided in the ears 17 and 18. When the upper mounting hook 19 is in its closed position, the slots 22—25 are in transverse alignment and are adapted to receive a lever 26. The lever 26 is pivotally mounted on a pin 27 carried by brackets 28 and 29 mounted on opposite sides of the slot 25 provided in ear 18. With the lever 26 positioned within the slots 22—25, the upper mounting hook 19 cannot be displaced from its closed position, and when it is desired to move the upper mounting hook 19 to its open position, it is only necessary to pivot the lever 26 clockwise as viewed in FIG. 2, to an inoperative position.

The quick-coupler 10 is also provided with an abutment member 30 which serves to position the upper hitch pin on an implement so that it will be engaged by the upper mounting hook 19 when the upper mounting hook is moved to its closed position. The abutment member 30 is mounted on the rear side of the transverse section 12 in any suitable manner such as welding and extends generally rearwardly and upwardly therefrom. The rear surface 31 of the abutment member 30 will engage the upper hitch pin when the lower hitch pins are positioned within the lower mounting hooks 14. When the upper mounting hook 19 is moved to its closed position, the upper end of the abutment member 30 will extend between the legs of the upper mounting hook.

The operation of the above-described quick-coupler is as follows. The quick-coupler is first connected to the power operated three-point hitch linkage of a tractor by positioning the legs of the lower mounting hooks 14 over the trailing ends of the tractor draft links and inserting mounting pins through the apertures 16 and the apertured ends of the draft links. The trailing end of the upper link of the tractor three-point hitch will extend between the legs of the upper mounting hook 19 and connect to the pin 20. Then, with the lever 26 moved to its inoperative position and the upper mounting hook 19 moved to its open position, the quick-coupler is lowered and the tractor is backed to an implement so that the lower mounting hooks 14 are positioned directly under the lower hitch pins of the implement. The quick-coupler is then raised by use of the power operated three-point hitch linkage until the lower hitch pins of the implement are engaged within the lower mounting hooks. At this time, if the upper hitch pin of the implement does not engage the rear face 31 of the abutment member 30, the tractor can again be backed until the upper hitch pin of the implement and the rear face 31 of the abutment member 30 move into engagement. The upper mounting hook 19 is then pivoted to its closed position illustrated in the drawing and is locked in this position by moving the lever 26 into the slots 22—25. With the upper mounting hook 19 in its closed position, the oppositely opened lower and upper hooks will prevent any relative movement between the coupler and implement and will therefore prevent removal of the hitch pins from the hook. The implement can be detached from the quick-coupler simply by moving the lever 26 to its inoperative position, pivoting the upper mounting hook 19 to its open position, and lowering the quick-coupler until the lower mounting hooks are again positioned below the lower hitch pins.

From the foregoing it can be seen that the present invention provides a quick-coupler which positively locks the implement hitch pins within the coupler-mounting hook, but yet is of extremely simple construction and is susceptible to economical manufacture.

I claim:

1. A quick-coupler device for connecting an implement having a pair of spaced lower hitch pins and a centered upper hitch pin to a tractor having a three-point hitch, said coupler device comprising a frame member having a generally transversely extending bight and a pair of depending legs; upwardly open hook members on the lower ends of the legs adapted to receive the lower hitch pins; hook means adapted to receive the upper hitch pin pivotally mounted on the bight for movement in a plane between a first position in which it is downwardly open; and latching means pivotally mounted on the bight for movement in a plane perpendicular to an intersecting the plane of movement of the hook means between an inoperative position out of the plane of movement of the hook means and an operative position in which it extends across the plane of movement of the hook means to abut against and prevent movement of the hook means to the first position.

2. The coupler device set forth in claim 1 further including abutment means mounted on the bight to engage the upper pin means when the upper pin means is positioned to be received by the hook means.

3. The coupler device set forth in claim 1 wherein the hook means is pivotally carried by a pin mounted intermediate the ends of and extending between a pair of transversely spaced upstanding ears fixedly secured to the bight, each of the ears is provided with an upwardly open slot at the upper end thereof, the hook means is provided with an open ended slot which moves into registry with the slots provided in the ears when the hook means is moved to the second position, and the latching means extends through all the slots when in the operative position.

4. A quick-coupler comprising: a generally inverted U-shaped frame having a transversely extending bight and a pair of depending legs; rearwardly extending and upwardly open hook members on the lower ends of the legs; hook means pivotally mounted on the bight for movement between a first position in which it is upwardly extending and rearwardly open and a second position in which it is rearwardly extending and downwardly open; and lever means pivotally mounted on the bight for movement in a path perpendicular to the path of movement of the hook means between an inoperative position and an operative position in which it extends across the path of movement of the hook means to abut against and prevent displacement of the hook means from the second position.

PO-1050
(5/69)

UNITED STATES PATENT OFFICE
CERTIFICATE OF CORRECTION

Patent No. 3,572,760      Dated 31 March 1971

Inventor(s)   Jess Jerome Jones

It is certified that error appears in the above-identified patent and that said Letters Patent are hereby corrected as shown below:

Column 3, line 26, before "downwardly" insert -- rearwardly open and a second position in which it is --; line 27, change "an" to -- and --.

Signed and sealed this 11th day of January 1972.

(SEAL)
Attest:

EDWARD M. FLETCHER, JR.　　　　　ROBERT GOTTSCHALK
Attesting Officer　　　　　　　　Acting Commissioner of Paten